(12) United States Patent
Nonomura et al.

(10) Patent No.: US 8,590,424 B2
(45) Date of Patent: Nov. 26, 2013

(54) AUTOMATIC TRANSMISSION

(75) Inventors: Akio Nonomura, Isehara (JP); Takuya Ooishi, Yokohama (JP); Kenji Kojima, Ebina (JP)

(73) Assignee: Jatco Ltd, Fuji-shi (JP)

( * ) Notice: Subject to any disclaimer, the term of this patent is extended or adjusted under 35 U.S.C. 154(b) by 614 days.

(21) Appl. No.: 12/827,514

(22) Filed: Jun. 30, 2010

(65) Prior Publication Data

US 2011/0011205 A1    Jan. 20, 2011

(30) Foreign Application Priority Data

Jul. 15, 2009   (JP) ................................ 2009-166446

(51) Int. Cl.
*F16H 57/02* (2012.01)
*B01D 27/08* (2006.01)

(52) U.S. Cl.
USPC ......... 74/606 R; 210/232; 210/240; 210/241; 210/243; 184/6.12; 184/6.24

(58) Field of Classification Search
USPC ....... 74/606 R, 606 A, 467; 210/167.08, 171, 210/440, 441, 443, 450, 453; 475/159; 184/6.12, 6.24
See application file for complete search history.

(56) References Cited

U.S. PATENT DOCUMENTS

| 1,847,926 | A |   | 3/1932  | Chase          |         |
|-----------|---|---|---------|----------------|---------|
| 4,795,278 | A |   | 1/1989  | Hayashi        |         |
| 4,940,937 | A |   | 7/1990  | Hattori et al. |         |
| 5,114,572 | A | * | 5/1992  | Hunter et al.  | 210/120 |
| 5,310,384 | A |   | 5/1994  | Siemon         |         |
| 5,871,411 | A |   | 2/1999  | Senger et al.  |         |
| 5,888,384 | A | * | 3/1999  | Wiederhold et al. | 210/130 |
| 6,089,999 | A |   | 7/2000  | Imaida et al.  |         |
| 6,315,693 | B1|   | 11/2001 | Tayama         |         |
| 6,319,132 | B1|   | 11/2001 | Krisher        |         |
| 6,392,405 | B1|   | 5/2002  | Nishizaki et al. |       |
| 6,498,475 | B2|   | 12/2002 | Foster et al.  |         |

(Continued)

FOREIGN PATENT DOCUMENTS

| DE | 196 09 792 A1 | 9/1997 |
| DE | 196 09 793 A1 | 9/1997 |
| JP | 2003-106415 A | 4/2003 |
| JP | 2005-133805 A | 5/2005 |

OTHER PUBLICATIONS

U.S. Appl. No. 12/827,497, filed Jun. 30, 2010, Kajigaya et al.

(Continued)

*Primary Examiner* — Richard W Ridley
*Assistant Examiner* — Richard V Wu
(74) *Attorney, Agent, or Firm* — Foley & Lardner LLP (57) ABSTRACT

An automatic transmission has a transmission casing accommodating a transmission mechanism and a filter case attached to the transmission casing and having an oil filter. The transmission casing has a concave portion with which at least an oil inlet or an oil outlet communicates and an overhanging portion positioned close to the concave portion and extending along a surface of the transmission casing with a clearance provided between the surface and the overhanging portion. The filter case has a case body inserted into the concave portion, a seal member sealing a boundary between an outer circumferential surface of the case body and an inside surface of the concave portion, a first brim portion protruding from the outer circumferential surface and fixed to the surface of the transmission casing, and a second brim portion protruding from the outer circumferential surface and inserted into the clearance.

5 Claims, 9 Drawing Sheets

(56) References Cited

U.S. PATENT DOCUMENTS

| | | |
|---|---|---|
| 6,591,177 B1 | 7/2003 | Loffler |
| 6,642,709 B2 | 11/2003 | Heimann, Jr. et al. |
| 6,716,341 B2 * | 4/2004 | Nguyen et al. ............ 210/167.08 |
| 6,843,056 B1 | 1/2005 | Langenfield et al. |
| 7,350,631 B2 | 4/2008 | Furuichi |
| 7,566,287 B2 | 7/2009 | Onishi et al. |
| 7,686,715 B2 | 3/2010 | Carlson et al. |
| D651,950 S | 1/2012 | Song |
| 2002/0144938 A1 * | 10/2002 | Hawkins et al. ................. 210/85 |
| 2003/0183564 A1 | 10/2003 | Nguyen et al. |
| 2003/0213336 A1 * | 11/2003 | Hori et al. ..................... 74/730.1 |
| 2004/0025825 A1 * | 2/2004 | Morita ....................... 123/196 A |
| 2004/0061493 A1 | 4/2004 | Fishburn et al. |
| 2004/0094383 A1 | 5/2004 | Kinoshita et al. |
| 2004/0188181 A1 * | 9/2004 | Hori et al. ..................... 184/6.12 |
| 2005/0090340 A1 | 4/2005 | Wang et al. |
| 2009/0058403 A1 | 3/2009 | Tomioka |

OTHER PUBLICATIONS

A. Kajigaya, U.S. PTO Office Action, U.S. Appl. No. 12/827,497, dated Apr. 4, 2012, 12 pages.

A. Kajigaya, U.S. PTO Office Action, U.S. Appl. No. 12/827,497, dated Jul. 31, 2012, 9 pages.

A. Kajigaya, U.S. PTO Notice of Allowance, U.S. Appl. No. 12/827,497, dated Feb. 15, 2013, 8 pages.

* cited by examiner

AUTOMATIC TRANSMISSION

BACKGROUND OF THE INVENTION

The present invention relates to an automatic transmission having an oil filter that is attached to a transmission casing.

In a related art, an automatic transmission through which oil discharged from an oil pump through a control valve unit is circulated in a transmission casing as lubricating oil after passing through an oil cooler and an oil filter has been known. For example, such an automatic transmission is disclosed in Japanese Patent Provisional Publication No. 2003-106415 (hereinafter is referred to as "JP2003-106415").

In this related art automatic transmission, an opening end surface of a filter case having therein the oil filter is contiguous with or touches the transmission casing, and a circumferential edge portion of this opening end surface is fixed with a plurality of screws. Further, a seal member is provided on a contact surface between the transmission casing and the filter case, and thereby preventing oil leakage.

SUMMARY OF THE INVENTION

In the related art automatic transmission in JP2003-106415, however, because the circumferential edge portion of the opening end surface is fixed with the plurality of screws, there is a need to secure space for arranging each screw around the filter case, and an installation position of the filter case is thus limited.

In addition, in a case where looseness of any of the plurality of screws occurs, a pressing force that presses the filter case against the transmission casing, i.e. a surface pressure that acts on the contact surface between the transmission casing and the filter case, becomes weak. This causes decrease in a sealing performance by the seal member, and the oil leakage might occur.

For these problems, it is therefore an object of the present invention to provide an automatic transmission which is capable of reducing fixing points of the filter case while securing the sealing performance between the transmission casing and the filter case.

According to one aspect of the present invention, an automatic transmission comprises: a transmission casing which houses therein a transmission mechanism, the transmission casing having (a) a concave portion with which at least an oil inlet or an oil outlet communicates at an inside of the concave portion and (b) an overhanging portion which is positioned close to the concave portion and extends along a surface of the transmission casing with a clearance provided between the surface and the overhanging portion, and a filter case which is attached to the transmission casing and has therein an oil filter, the filter case having (c) a case body which is inserted into the concave portion, (d) a seal member which fits onto an outer circumference of the case body and seals a boundary between an outer circumferential surface of the case body inserted into the concave portion and an inside surface of the concave portion, (e) a first brim portion which protrudes from the outer circumferential surface of the case body and is fixed to the surface of the transmission casing and (f) a second brim portion which protrudes from the outer circumferential surface of the case body and is inserted into the clearance.

The other objects and features of this invention will become understood from the following description with reference to the accompanying drawings.

DETAILED DESCRIPTION OF THE INVENTION

According to an automatic transmission of the present invention, a case body is inserted into a concave portion that is formed at an transmission casing, and a boundary between an outer circumferential surface of the case body and an inside surface of the concave portion is sealed with a seal member which fits onto an outer circumference of the case body. With this, a sealing performance by the seal member is secured by a difference in dimension between an outside diameter of the case body and an inside diameter of the concave portion. And even if the case body rattles, the sealing performance by the seal member can be secured. As a result, the oil leakage from the boundary between the outer circumferential surface of the case body and the inside surface of the concave portion can surely be prevented.

Further, since the sealing performance is secured by the difference in dimension between the outside diameter of the case body and the inside diameter of the concave portion, there is no need to press a filter case against the transmission casing. Further, a first brim portion is fixed to the transmission casing and a second brim portion is inserted into a clearance between a surface of the transmission casing and an overhanging portion, and attachment of the case body to the transmission casing can be achieved. As a consequence, fixing points of the filter case to the transmission casing can be reduced. In addition, even in a case where the first brim portion comes off from the transmission casing, since the second brim portion interferes with the overhanging portion, the filter case does not fall out and the sealing performance is not impaired. Hence, it is possible to reduce the fixing points of the filter case while securing the sealing performance between the transmission casing and the filter case.

Embodiments of the present invention will now be explained below with reference to the drawings.

Embodiment 1

First, a system in the present invention will be explained. A power train shown in FIG. 1 has an engine 1 that is a drive source, a torque converter 2 that is connected with and driven by the engine 1, an automatic transmission 3 that is connected with and driven by the torque converter 2, and wheels 6, 6 to which a power is transmitted and outputted from the automatic transmission 3 through a drive shaft 6a. The automatic transmission 3 is controlled by a transmission control section 7 having a continuously variable transmission control section (a CVT control section) 7a that controls an after-mentioned continuously variable transmission mechanism (CVT mechanism) 20 and a multi-range (or a geared) transmission control section 7b that controls an after-mentioned multi-range (or geared) transmission mechanism 30. The automatic transmission 3 has a transmission mechanism TM that is housed in a transmission casing 8.

Figure 2:
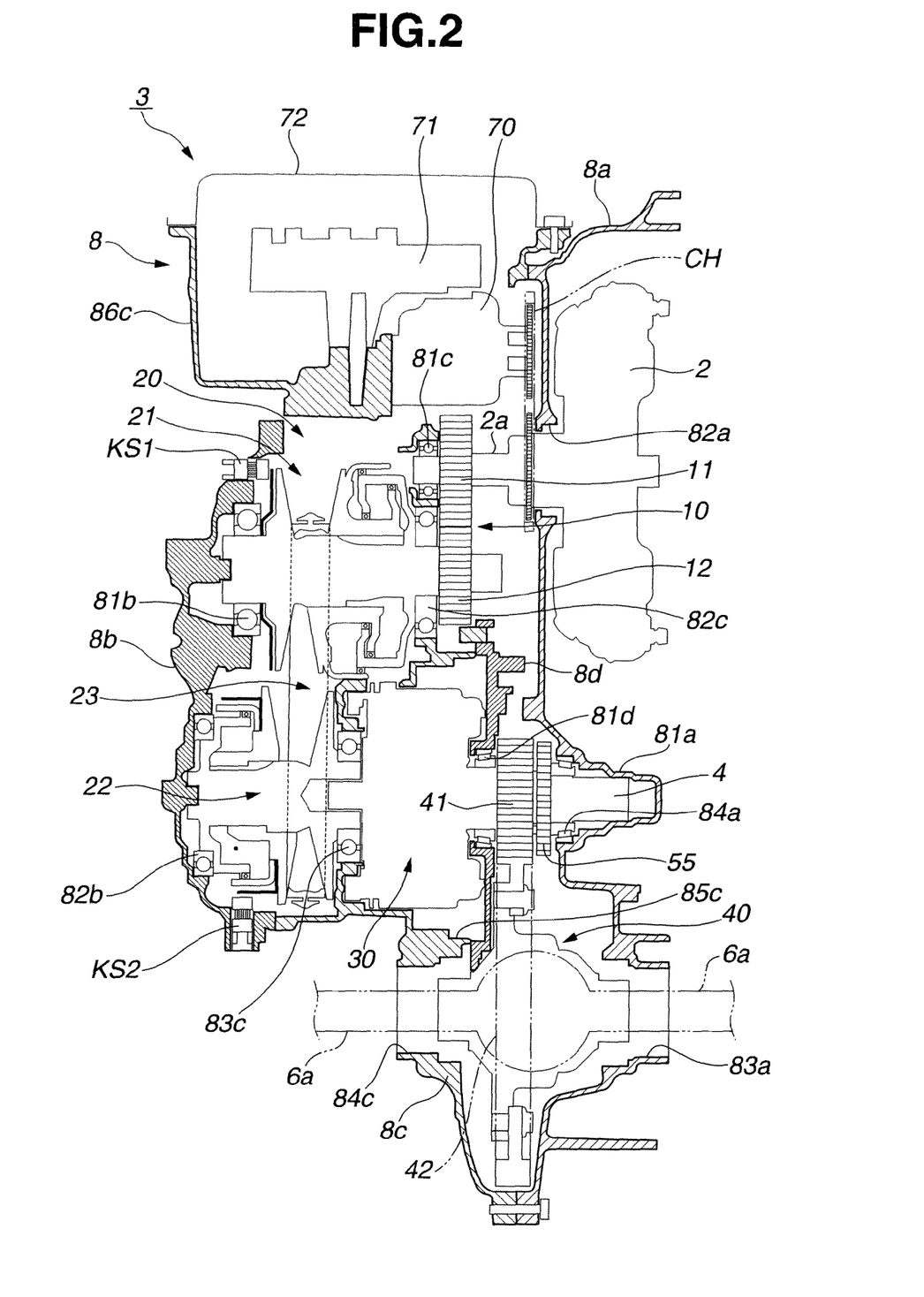
FIG. 2 is a sectional development showing the automatic transmission of the embodiment 1.

As shown in FIG. 2, the transmission casing 8 has a converter housing 8a, a transmission case 8c, a transmission cover 8b, and a bearing retainer 8d. Further, a filter case 50 having therein an oil filter F is externally attached to the transmission casing 8, and an oil passage Y (see FIGS. 5 and 6) is formed in the transmission casing 8.

The converter housing 8a has a concave portion 81a in which the torque converter 2 is installed. The converter housing 8a forms an outer surface of the transmission casing 8 on a torque converter side. The converter housing 8a is provided with an input shaft penetration opening 82a into which an output shaft 2a of the torque converter 2 is inserted, and also provided with a drive shaft penetration opening 83a from which the drive shaft 6a protrudes. The input shaft penetration opening 82a is formed in the center of the concave portion 81a. In addition, an output bearing 84a for supporting a transmission output shaft 4 is provided at an inside surface of the converter housing 8a.

The transmission case 8c is combined with the converter housing 8a, and forms an outer surface or shell of the transmission casing 8. The transmission case 8c is provided therein with an input shaft bearing 81c for supporting the output shaft 2a of the torque converter 2, and also provided with a primary pulley bearing 82c for supporting an input shaft of a primary pulley 21, further provided with a secondary pulley bearing 83c for supporting an output shaft of a secondary pulley 22. Moreover, the transmission case 8c is provided with a drive shaft penetration opening 84c from which the drive shaft 6a protrudes. In addition, the transmission case 8c has a concave portion 85c in which the multi-range transmission mechanism 30 is installed, and has a valve unit case portion 86c that houses a control valve unit 71.

Figure 4:
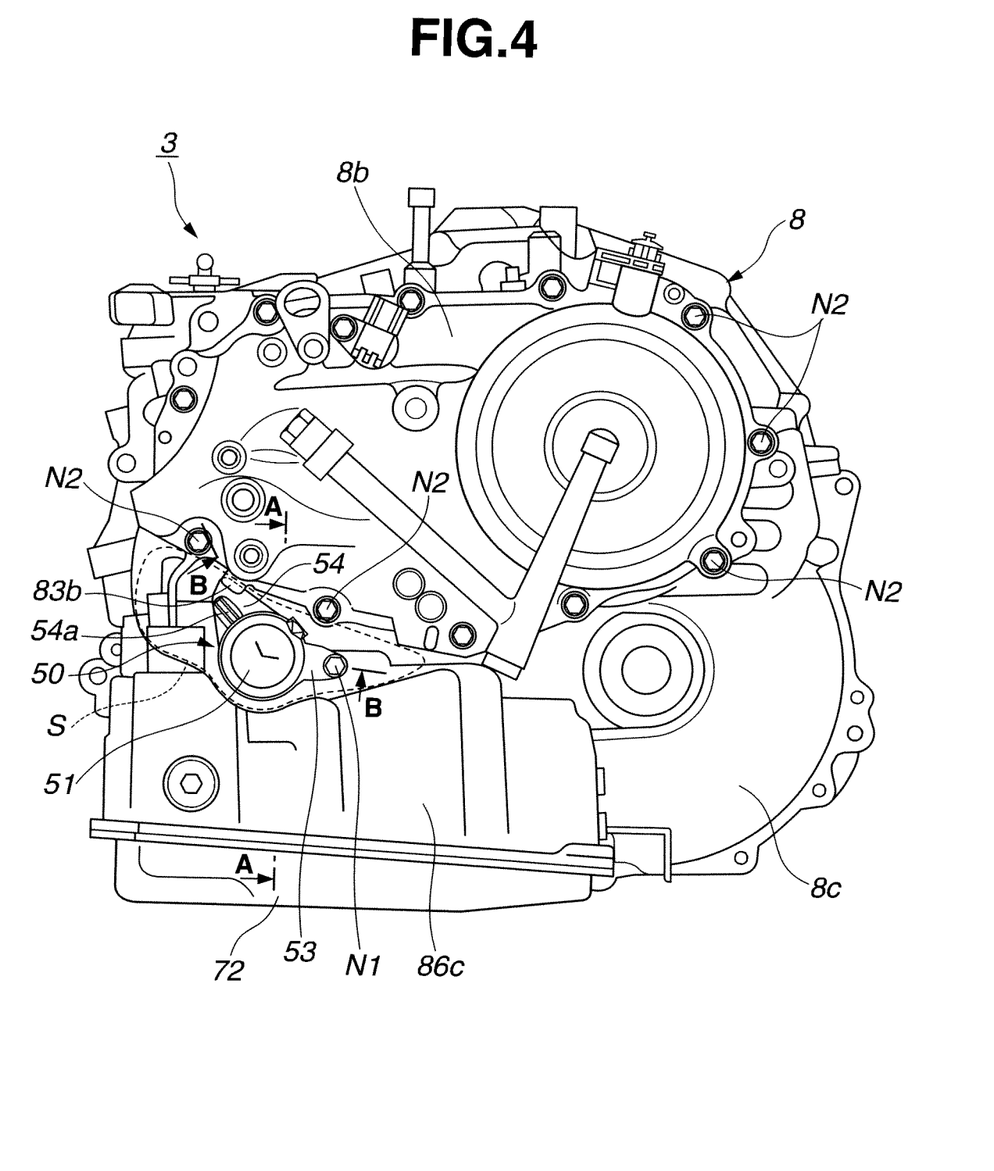
FIG. 4 is a side view of a transmission case of the automatic transmission of the embodiment 1.
Figure 5:
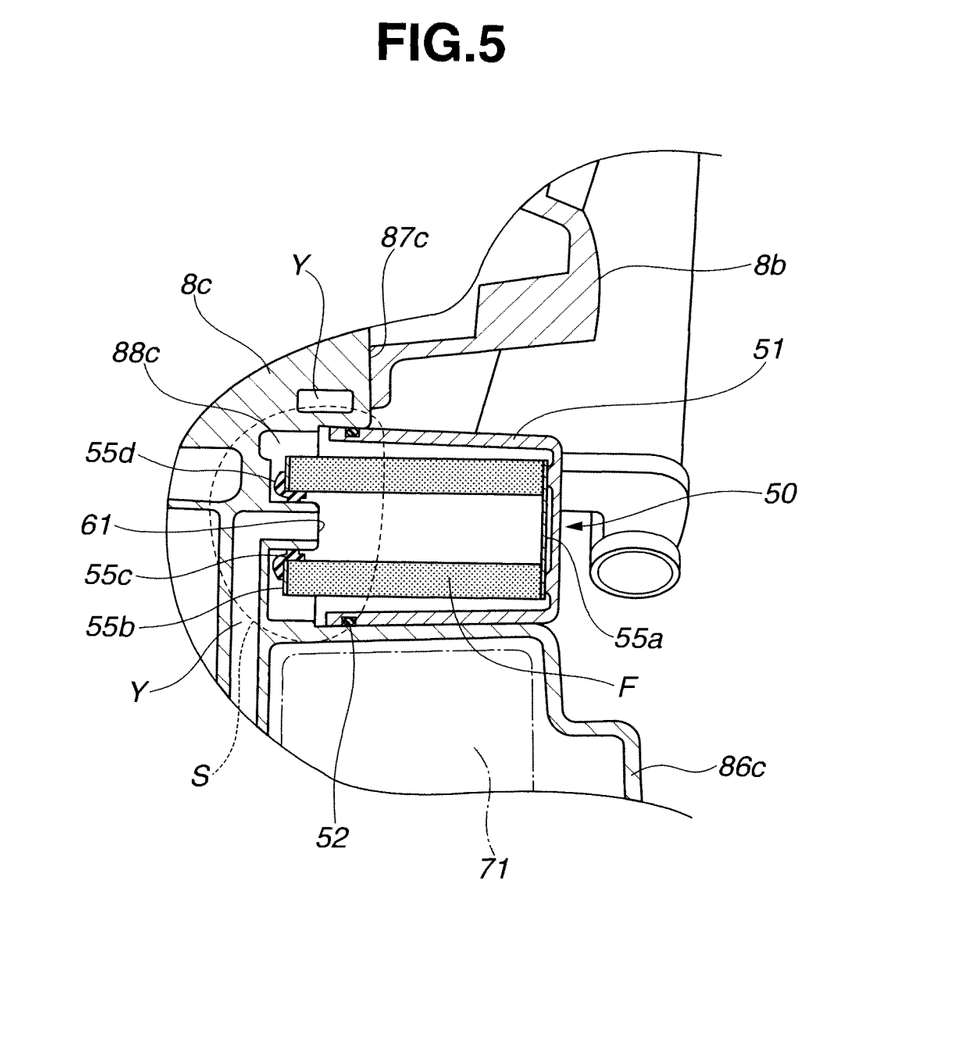
FIG. 5 is a sectional view of A-A in FIG. 4.
Figure 6:
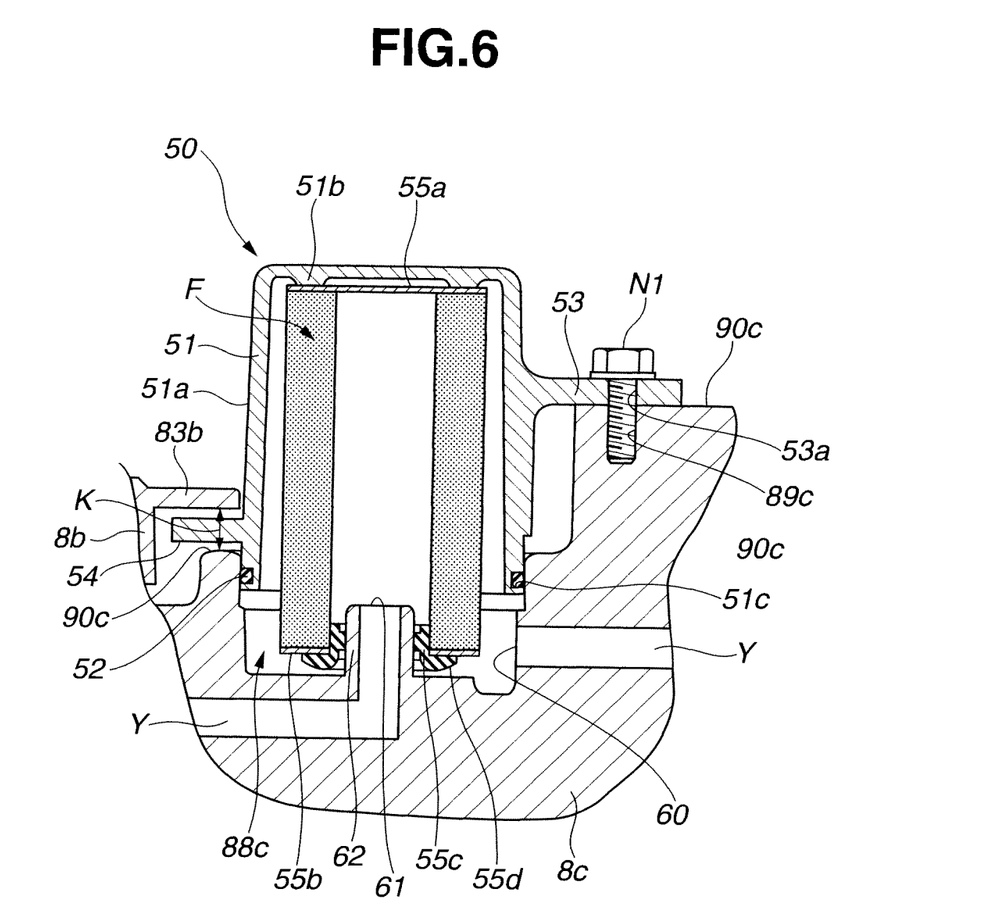
FIG. 6 is a sectional view of B-B in FIG. 4.

As shown in FIGS. 5 and 6, on an outer surface 90c of the transmission case 8c (on a surface 90c of the transmission casing), a cover attachment surface 87c to which the transmission cover 8b is attached, a filter concave portion (a concave portion) 88c into which the filter case 50 is inserted, and a screw hole 89c into which a fixing screw N1 for fixing the filter case 50 is screwed, are provided. On the cover attachment surface 87c, a plurality of screw holes (not shown) into which a fixing screw N2 (see FIG. 4) for fixing the transmission cover 8b is screwed are provided.

Here, the transmission cover 8b attached to the cover attachment surface 87c and the valve unit case portion 86c are placed on upper and lower sides of a filter attachment area S (see FIGS. 4 and 5) where the filter concave portion 88c and the screw hole 89c are provided. Further, the transmission cover 8b and the valve unit case portion 86c protrude or extend in an axial direction as compared with the filter attachment area S (conversely, the filter attachment area S is placed in a depressed or hollow position in the axial direction). As can be seen in FIG. 6, the filter attachment area S has concave and convex surfaces, and a position in which the screw hole 89c is provided protrudes in the axial direction as compared with a position in which the filter concave portion 88c is provided.

As shown in FIGS. 5 and 6, an oil inlet 60 and an oil outlet 61 open in an inside of the filter concave portion 88c. Each of these oil inlet and outlet 60 and 61 communicates with the oil passage Y formed in the transmission case 8c. With this, the oil flowing in the oil passage Y flows into the filter concave portion 88c from the oil inlet 60, and flows out from the oil outlet 61 to the oil passage Y.

The oil inlet 60 opens at a side surface of the filter concave portion 88c, and the oil outlet 61 opens at a bottom surface of the filter concave portion 88c. The oil outlet 61 is formed at a top end of a tube part 62 that protrudes from the bottom surface.

Returning to FIG. 2, the transmission cover 8b covers axial direction end surfaces of the primary pulley 21 and the secondary pulley 22 of the CVT mechanism 20. The transmission cover 8b forms the outer surface of the transmission casing 8 on a CVT mechanism side. The transmission cover 8b is provided with a primary pulley bearing 81b for supporting the primary pulley 21, and also provided with a secondary pulley bearing 82b for supporting the secondary pulley 22. Further, a primary pulley rotation speed sensor KS1 that detects the number of revolutions of the primary pulley 21 and a secondary pulley rotation speed sensor KS2 that detects the number of revolutions of the secondary pulley 22 penetrate and are fixed to the transmission cover 8b.

On a circumferential edge portion of the transmission cover 8b, a contact surface (not shown) that is contiguous with or touches the cover attachment surface 87c of the transmission case 8c and a plurality of attachment screw penetration holes (not shown) where the fixing screw N2 penetrates are provided. Additionally, as shown in FIGS. 4 and 6, the transmission cover 8b is provided, on the circumferential edge portion, with an overhanging portion 83b that is positioned close to the filter concave portion 88c of the transmission case 8c.

The overhanging portion 83b extends or sticks out along and over the outer surface 90c of the transmission case 8c with a clearance K (see FIG. 6) provided between the outer surface 90c and the overhanging portion 83b.

The bearing retainer 8d is so fixed as to cover the concave portion 85c of the transmission case 8c. The bearing retainer 8d is provided with an output shaft bearing 81d for supporting the transmission output shaft 4 that is connected with and driven by the multi-range transmission mechanism 30.

Figure 1:
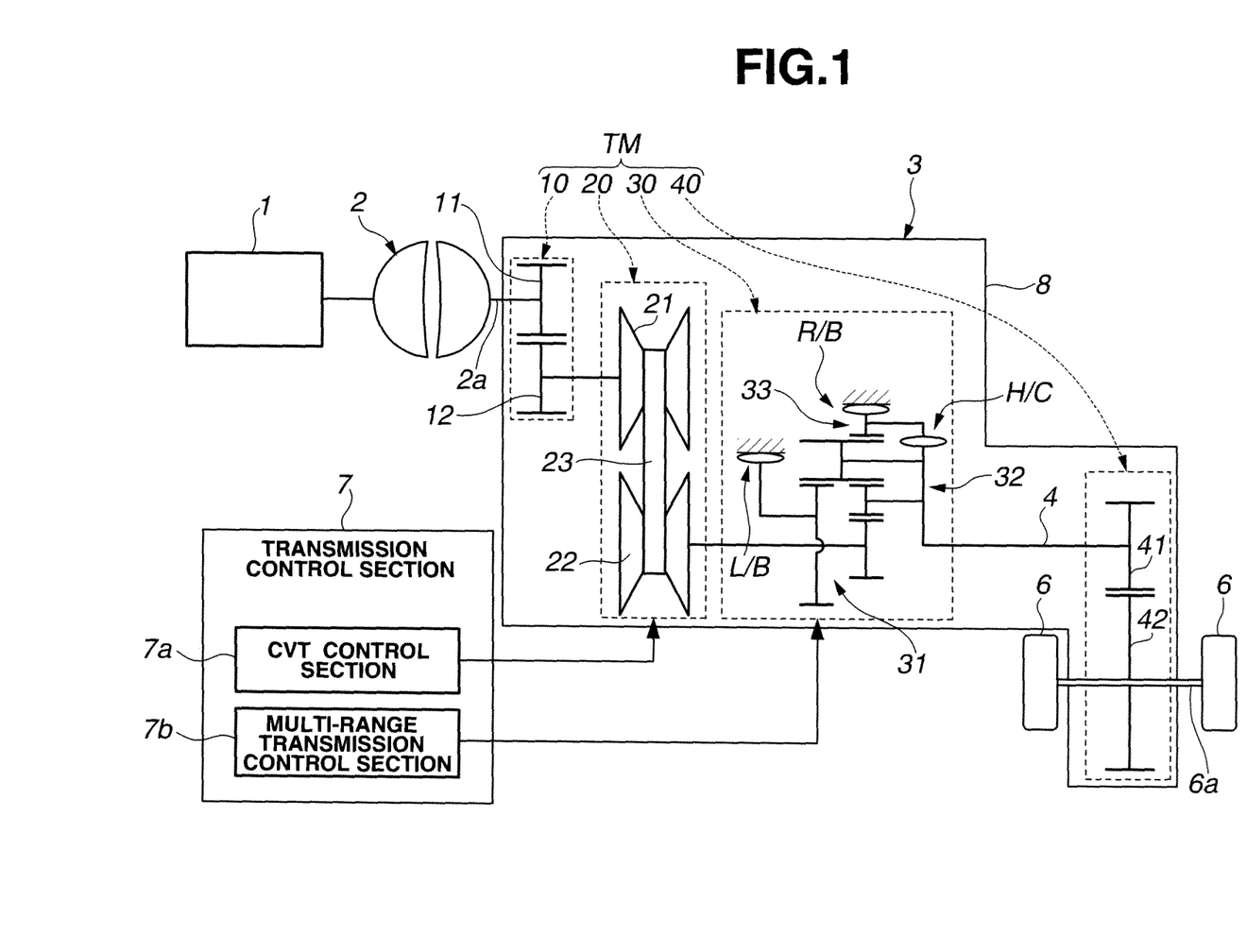
FIG. 1 is a schematic system diagram showing a power train in which an automatic transmission of an embodiment 1 is mounted.

Next, the transmission mechanism TM will be explained. As shown in FIGS. 1 and 2, the transmission mechanism TM has a transmission gear mechanism 10, the CVT mechanism 20, the multi-range transmission mechanism 30, and a final drive gear mechanism 40.

The transmission gear mechanism 10 has a drive gear 11 that is secured to the output shaft 2a of the torque converter 2 and a driven gear 12 that is secured to the input shaft of the primary pulley 21 of the CVT mechanism 20. Here, a transmission ratio is arbitrarily set by a gear ratio between the drive gear 11 and the driven gear 12.

The CVT mechanism 20 is an existing belt-drive CVT having the primary pulley 21, the secondary pulley 22 and a belt 23 that is wound around these both pulleys 21 and 22. The driven gear 12 is secured to the input shaft of the primary pulley 21, and the power from the transmission gear mechanism 10 is inputted to the primary pulley 21. An output shaft of the secondary pulley 22 connects with the multi-range transmission mechanism 30 and drives the multi-range transmission mechanism 30. The primary pulley 21 and the secondary pulley 22 are each supplied with oil (fluid), and each pulley width of the primary and secondary pulleys 21, 22 can be freely varied according to their respective fluid pressures. In this CVT mechanism 20, by controlling these fluid pressures supplied to the primary and secondary pulleys 21, 22, the transmission ratio can be continuously varied.

The multi-range transmission mechanism 30 has a ravigneaux planetary gear mechanism. As can be seen in FIG. 1, a combined sun gear 31 of the ravigneaux planetary gear mechanism is connected to and driven by the secondary pulley 22 of the CVT mechanism 20, and the combined sun gear 31 acts as an input of the ravigneaux planetary gear mechanism. A carrier 32 connects with and drives the transmission output shaft 4, and the carrier 32 acts as an output of the ravigneaux planetary gear mechanism. The combined sun gear 31 is fixed to the transmission casing 8 through a low brake (a $1^{st}$ speed selection brake) L/B. The carrier 32 meshes with and is driven by a ring gear 33 through a high clutch (a $2^{nd}$ speed selection clutch) H/C. Further, the ring gear 33 is fixed to the transmission casing 8 through a reverse brake R/B.

In the multi-range transmission mechanism 30, the low brake L/B, the high clutch H/C and the reverse brake R/B are also supplied with oil (fluid), and their engagement/disengagement can be controlled according to the respective supplied fluid pressures. With this fluid pressure control, the forward $1^{st}$ speed, the forward $2^{nd}$ speed and a reverse $1^{st}$ speed of the multi-range transmission mechanism 30 can be selected.

When selecting the forward $1^{st}$ speed, only the low brake L/B is engaged. When selecting the forward $2^{nd}$ speed, only the high clutch H/C is engaged. Further, when selecting the reverse $1^{st}$ speed, the reverse brake R/B is engaged. A relationship of the engagement/disengagement of each brake and clutch L/B, H/C, R/B when controlling the multi-range transmission mechanism 30 is shown in a following Table 1. In the table, "○" denotes "engagement", "x" denotes "disengagement (release)".

TABLE 1

|  | L/B | H/C | R/B |
| --- | --- | --- | --- |
| Forward 1st speed | ○ | X | X |
| Forward 2nd speed | X | ○ | X |
| Reverse 1st speed | X | X | ○ |

When carrying out gear shift in the multi-range transmission mechanism 30, by performing a cooperative shift control between the CVT mechanism 20 and the multi-range transmission mechanism 30, a shift shock is suppressed.

The final drive gear mechanism 40 has a drive gear 41 which is secured to the transmission output shaft 4 protruding from the bearing retainer 8d toward the converter housing 8a and a driven gear 42 which is secured to the drive shaft 6a penetrating the converter housing 8a and the transmission case 8c and connects with the wheels 6, 6 through the drive shaft 6a. Here, a speed reduction ratio is arbitrarily set by a gear ratio between the drive gear 41 and the driven gear 42.

In FIG. 2, reference sign 70 is an oil pump, reference sign 71 is a control valve unit, reference sign 72 is an oil pan. The oil pump 70 is connected to the output shaft 2a of the torque converter 2 through a chain CH, and is driven by rotation of the output shaft 2a. The control valve unit 71 controls or regulates the oil (working fluid) discharged from the oil pump 70 to a proper fluid pressure, and supplies it to the transmission mechanism TM.

Figure 3:
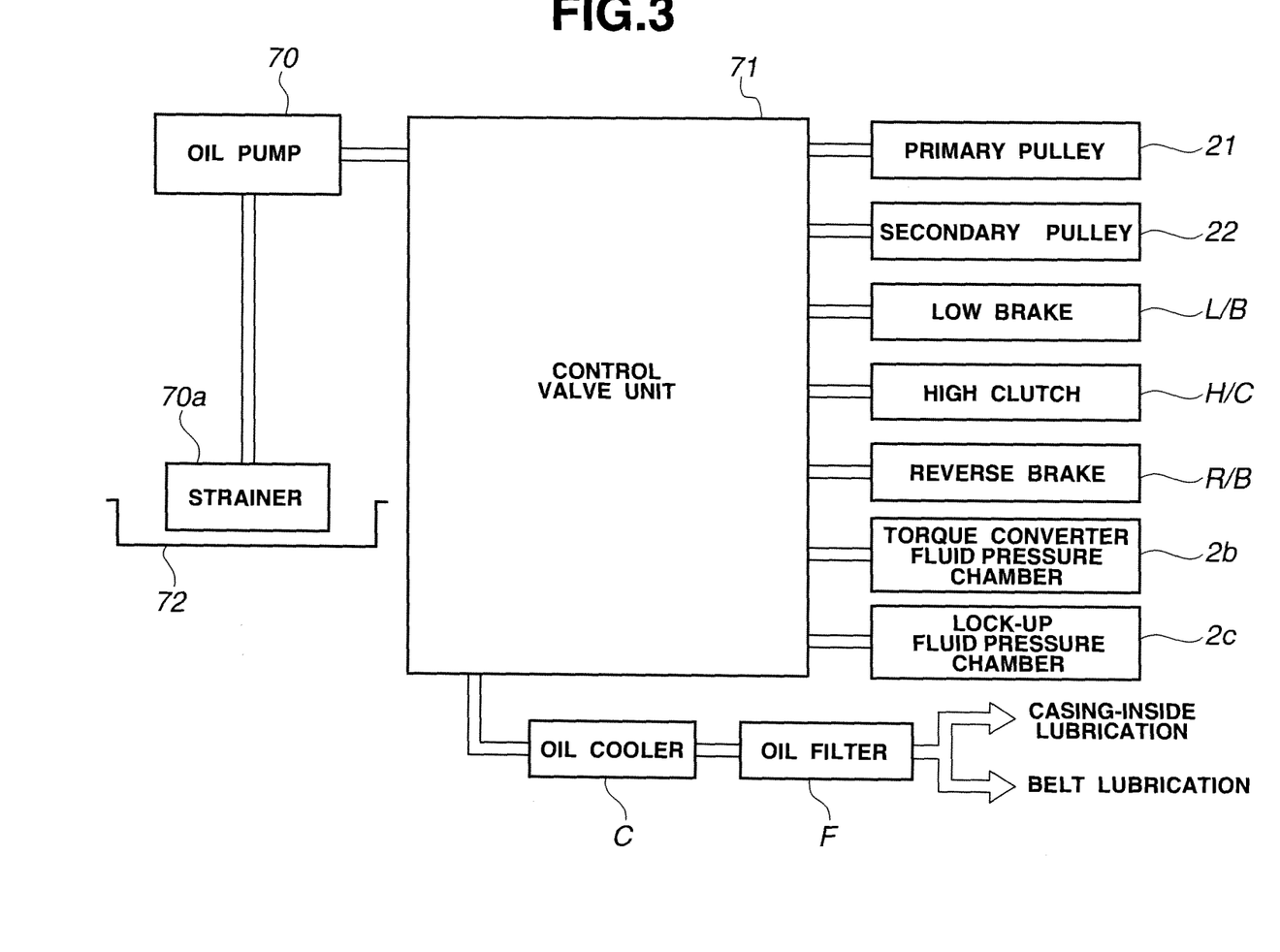
FIG. 3 is a schematic circuit diagram showing a hydraulic circuit in the automatic transmission of the embodiment 1.

In FIG. 3, a schematic hydraulic circuit in the automatic transmission 3 is shown. When the oil pump 70 is driven by the rotation of the output shaft 2a of the torque converter 2, the oil stored in the oil pan 72 is pumped up by the oil pump 70 through a strainer 70a and is supplied to the control valve unit 71. The oil supplied to the control valve unit 71 is regulated to the proper fluid pressure, and supplied to the primary pulley 21, the secondary pulley 22, the low brake L/B, the high clutch H/C, the reverse brake R/B, a torque converter fluid pressure chamber (a torque converter release pressure chamber) 2b and a lock-up fluid pressure chamber (a torque converter applier chamber) 2c.

Remaining oil that is not supplied to each component (e.g. the pulley) from the control valve unit 71 serves as lubricating oil, and is supplied to an oil cooler C, then is cooled through a cooling medium such as cooling water. The oil cooled in the oil cooler C is supplied to the oil filter F through the oil passage formed in the transmission casing 8. The oil filter F filters out foreign matter or contaminant such as sputtering residue and metal shavings (or filings). Part of the filtered oil is sprayed to each part in the transmission casing 8 as casing-inside lubrication, and part of the filtered oil is sprayed to the belt 23 of the CVT mechanism 20 as belt lubrication.

The filter case 50 has, as shown in FIGS. 5 and 6, a closed-bottomed cylindrical-shaped case body 51 whose one side opens, an O-ring (a seal member) 52 fitting onto an outer circumference of the case body 51, a fixing brim portion (a first brim portion) 53 that sticks out from a case body outer circumferential surface 51a, and an inserting brim portion (a second brim portion) 54.

The case body 51 has a cup-shape whose size allows the oil filter F to be inserted into the case body. On an inner side of a bottom of the case body 51, a ring-shaped protrusion 51b that touches the oil filter F is formed. Further, on the outer circumferential surface 51a on the opening end side, an annular groove 51c into which the O-ring 52 fits is formed throughout an entire circumference of the outer circumferential surface 51a, close to the opening end. This opening end side is inserted into the filter concave portion 88c.

The O-ring 52 is positioned between the oil inlet and outlet 60, 61 and an opening of the filter concave portion 88c when the case body 51 is inserted into the filter concave portion 88c, and seals a boundary between the case body outer circumferential surface 51a inserted into the filter concave portion 88c and an inside surface of the filter concave portion 88c. Here, by fitting the O-ring 52 into the annular groove 51c, movement or deviation in an axial direction, of the case body 51 is prevented.

The fixing brim portion 53 is provided with a screw penetration hole 53a where the fixing screw N1 penetrates. As can be seen in FIG. 6, the fixing brim portion 53 touches the outer surface 90c of the transmission case 8c when the case body 51 is inserted into the filter concave portion 88c.

Figure 7A:
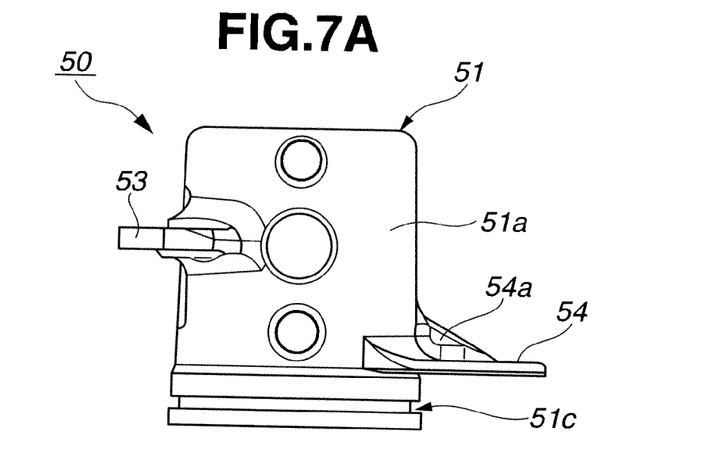
FIG. 7A is a side view of a case body of a filter case.
Figure 7B:
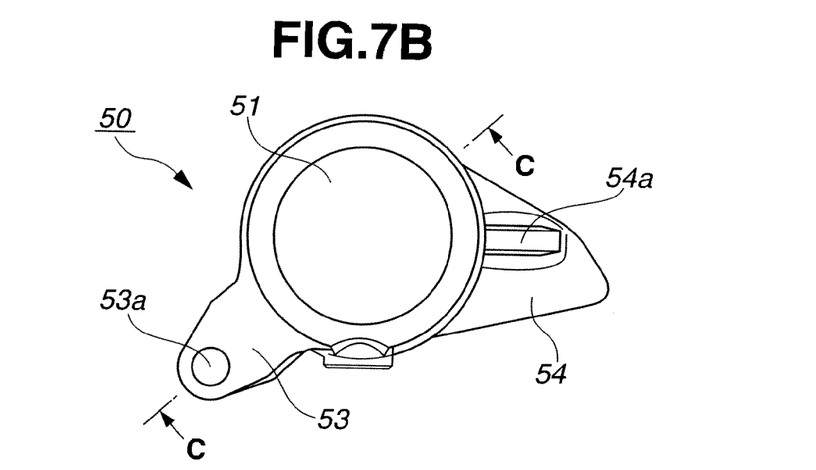
FIG. 7B is a top view of the case body.
Figure 7C:
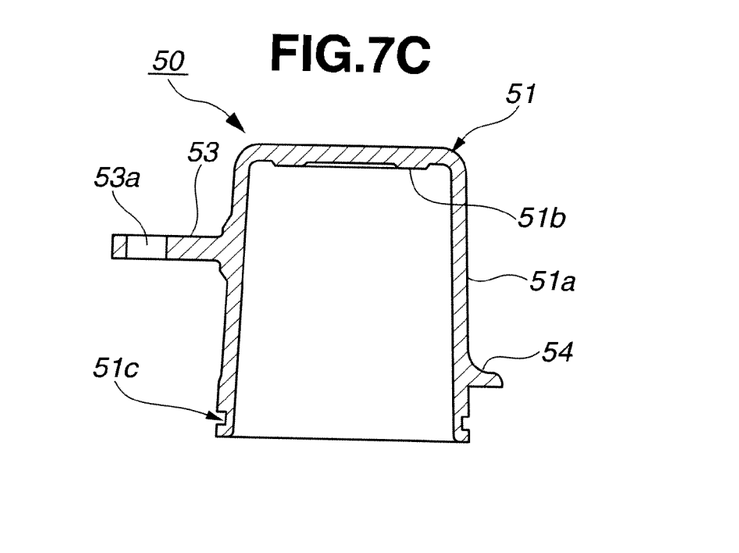
FIG. 7C is a sectional view of C-C in FIG. 7B.

The inserting brim portion 54 is a plate portion that is inserted into the clearance K between the transmission case 8c and the overhanging portion 83b with clearances provided between the inserting brim portion 54 and the transmission case 8c and also between the inserting brim portion 54 and the overhanging portion 83b, when the case body 51 is inserted into the filter concave portion 88c. That is, a thickness of the inserting brim portion 54 is set to be smaller (thinner) than the clearance K between the outer surface 90c of the transmission case 8c and the overhanging portion 83b. In addition, as shown in FIGS. 7A and 7B, the inserting brim portion 54 is provided with a whirl-stop protrusion (a rib) 54a which protrudes from the case body 51 in the axial direction and touches a side surface of the overhanging portion 83b when inserted into the clearance K.

The oil filter F is made of material such as nonwoven fabric whose both ends are open and which has a hollow cylindrical shape. Both opening ends of the oil filter F are covered with a disc-shaped first cover member 55a and a disc-shaped second cover member 55b which are made of iron. These first and second cover members 55a and 55b prevent the oil from being impregnated into the oil filter F from the both ends. The second cover member 55b is provided with an opening portion 55c which faces or corresponds to a center space of the oil filter F. Furthermore, a cylindrical packing 55d, both ends of which open and one end of which is provided with a flange, is inserted into the opening portion 55c. The flange portion of the cylindrical packing 55d touches the second cover member 55b when the cylindrical packing 55d is inserted into the opening portion 55c.

Regarding insertion of the oil filter F, as shown in FIGS. 5 and 6, one end of the oil filter F to which the first cover member 55a is attached is inserted toward the bottom of the case body 51, then the oil filter F is inserted into the case body 51. When inserted, the first cover member 55a touches the protrusion 51b, and space is created between a circumferential surface of the oil filter F and an inner circumferential surface of the case body 51. On the other hand, the other end of the oil filter F to which the second cover member 55b is attached protrudes from the opening end of the case body 51.

When the filter case 50 is fixed to the transmission case 8c, the tube part 62 protruding from the bottom surface of the filter concave portion 88c is inserted into the center space of the oil filter F. Here, the cylindrical packing 55d is previously inserted into this center space through the opening portion 55c of the second cover member 55b. Because of this, the tube part 62 is inserted into the cylindrical packing 55d, and a gap between the tube part 62 and the oil filter F is sealed with the cylindrical packing 55d.

Next, operation or working will be explained. First, [Fixing structure of the related art filter case and its problem] will be explained. Subsequently, operation or working of the automatic transmission of the embodiment 1 will be explained in [Achievement of prevention of oil leakage] and [Achievement of reduction of fixing points]

[Fixing Structure of the Related Art Filter Case and its Problem]

Figure 8A:
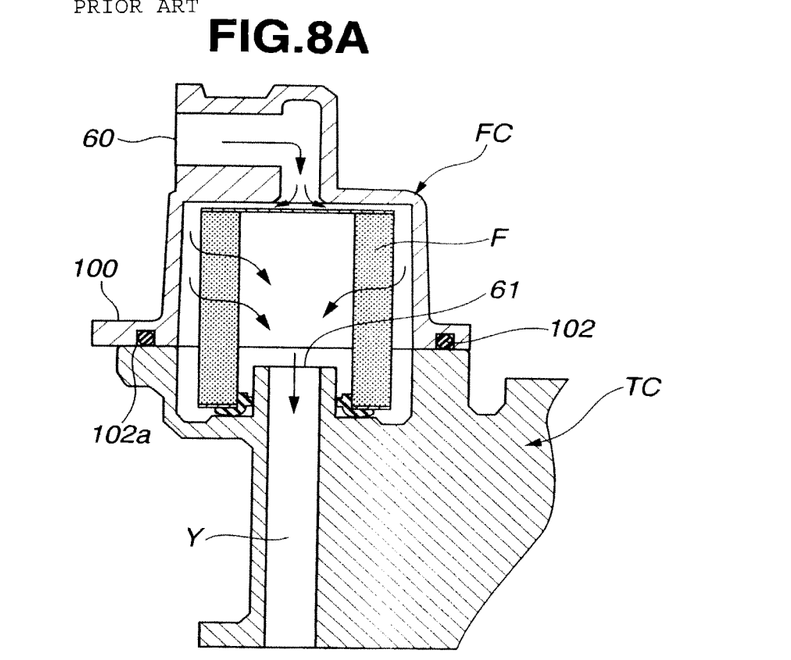
FIG. 8A is a sectional view showing a main part in an automatic transmission of a comparative example.
Figure 8B:
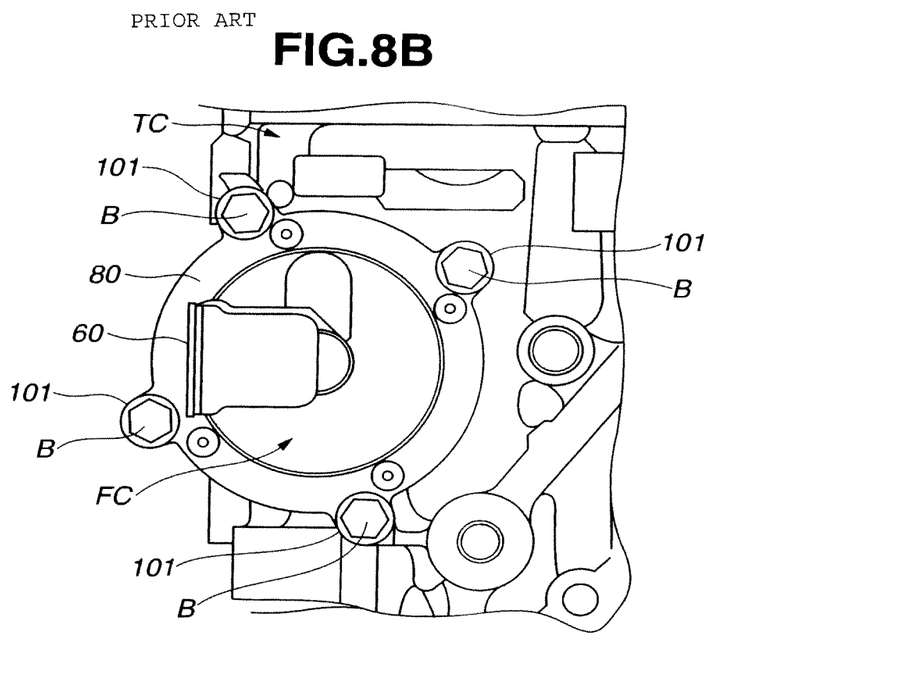
FIG. 8B is a top view of the main part in the automatic transmission of the comparative example.

FIGS. 8A and 8B are a sectional view and a top view of a fixing structure of the related art filter case. In this fixing structure of the related art filter case, an oil passage Y having an oil outlet 61 is formed in the transmission case TC, and a filter case FC having therein an oil filter F is fixed to the transmission case TC so as to be over this oil outlet 61 (or so as to cover this oil outlet 61). In addition, the filter case FC is provided with an oil inlet 60, and the oil inlet 60 is connected to an oil passage (not shown).

The filter case FC has a contact flange surface 100 that touches the transmission case TC. This contact flange surface 100 is formed throughout an entire circumference of an opening end of the filter case FC. Further, a plurality of bolt fixing holes 101 (in four positions in the drawing) are arranged at certain intervals so as to surround the entire circumference of the filter case FC. The contact flange surface 100 is provided with a groove portion 102a into which an O-ring (a seal member) 102 fits.

The O-ring 102 fitting into the groove portion 102a is in absolute contact with the transmission case TC when the filter case FC is fixed to the transmission case TC, and seals a contact surface between the transmission case TC and the filter case FC.

On the other hand, fixing bolts B are inserted into the bolt fixing holes 101 and screwed, then the filter case FC is fixed to the transmission case TC. With a fixing force by the plurality of fixing bolts B, i.e. with a pressing force that acts on the filter case FC by the fixing bolts B, a sealing performance by the O-ring 102 is secured.

This fixing structure of the related art filter case is configured so that the oil flowing into the filter case FC from the oil inlet 60 formed in the filter case FC is impregnated into the oil filter F and flows out to the oil passage Y formed in the transmission case TC from the oil outlet 61 that is inserted into a center space of the oil filter F.

In this fixing structure of the related art filter case, because the filter case FC is fixed to the transmission case TC with the plurality of fixing bolts B arranged so as to surround the entire circumference of the filter case FC, there is a need to secure space for arranging each fixing bolt B around the filter case FC, and there is a problem that an installation position of the filter case FC is limited. Furthermore, because the contact surface between the transmission case TC and the filter case FC is sealed, if asperities exist on the contact surface, it is difficult to secure the sealing performance. For this reason, in this case, it is required that the contact surface be flat.

That is to say, the fixing structure of the related art filter case requires not only the annular flat surface on the transmission case TC side which is in absolute contact with the contact flange surface 100 of the filter case FC, but also the space that allows the fixing bolts B to be arranged at constant intervals around its entire circumference is needed. For this reason, a problem that size reduction of the transmission casing is difficult arises.

Moreover, if looseness of any of the plurality of fixing bolts B that secure the filter case FC to the transmission case TC occurs, the pressing force which acts on the contact surface between the transmission case TC and the filter case FC and presses the O-ring 102 against the transmission case TC decreases. The sealing performance by this O-ring 102 is therefore decreased, and there is a risk that the oil leakage from the contact surface will occur. Further, if the oil leakage occurs, an oil quantity in the automatic transmission 3 will be reduced and reduction in the fluid pressure will arise, and this might cause a situation where a vehicle is unable to travel.

[Achievement of Prevention of Oil Leakage]

In the automatic transmission 3 in the embodiment 1, the oil, which flows into the filter concave portion 88c from the oil inlet 60 formed in the transmission case 8c, is impregnated into the oil filter F from the outer circumferential surface of the oil filter F toward the center space, and flows out to the oil passage Y from the oil outlet 61. With this oil flow, the oil is filtered by the oil filter F.

As explained above, the filter case 50 into which the oil filter F is inserted is inserted into the filter concave portion 88c, and the boundary between the case body outer circumferential surface 51a and the inside surface of the filter concave portion 88c is sealed with the O-ring 52 fitting into the annular groove 51c formed on the outer circumferential surface 51a of the case body 51. With this, the oil leakage from a contact surface between the filter case 50 and the transmission case 8c is prevented. Here, the sealing performance by the O-ring 52 is secured by a difference in dimension between an outside diameter of the case body 51 and an inside diameter of the filter concave portion 88c.

Further, since the sealing performance by the O-ring 52 is secured by the difference in dimension between the outside diameter of the case body 51 and the inside diameter of the filter concave portion 88c, for example, even if the case body 51 rattles, the sealing performance by the O-ring 52 between the case body outer circumferential surface 51a and the inside surface of the filter concave portion 88c is not impaired. Thus, regardless of the rattling of the case body 51, the sealing performance can be secured, and the oil leakage from the contact surface between the filter case 50 and the transmission case 8c can surely be prevented.

Furthermore, in the automatic transmission 3 in the embodiment 1, the O-ring 52 is positioned between the opening of the filter concave portion 88c and the oil inlet and outlet 60, 61 which communicate with this filter concave portion 88c when the filter case 50 is inserted into the filter concave portion 88c.

With this, the leakage of the oil flowing into the filter concave portion 88c from the oil inlet 60 and flowing out from the oil outlet 61 through the oil filter F, from the contact surface between the filter concave portion 88c and the filter case 50 can surely be prevented.

[Achievement of Reduction of Fixing Points]

In the automatic transmission 3 in the embodiment 1, in order to fix the filter case 50 to the transmission case 8c, first, the oil filter F is attached to the filter concave portion 88c of the transmission case 8c. At this time, the first and second cover members 55a and 55b are previously attached to the both ends of the oil filter F, also the cylindrical packing 55d is previously inserted into the opening portion 55c of the second cover member 55b. And the tube part 62 protruding from the bottom surface of the filter concave portion 88c is inserted into the cylindrical packing 55d, then the oil filter F is fixed in the filter concave portion 88c.

Next, the oil filter F fixed in the filter concave portion 88c is covered by the filter case 50. At this time, the O-ring 52 is previously fitted into the annular groove 51c of the case body 51 of the filter case 50. And the opening end of the case body 51 is inserted into the filter concave portion 88c, then the oil filter F is covered by the filter case 50. Here, when the filter case 50 covers the oil filter F, the ring-shaped protrusion 51b touches the first cover member 55a, and this prevents the first cover member 55a from floating.

Figure 9:
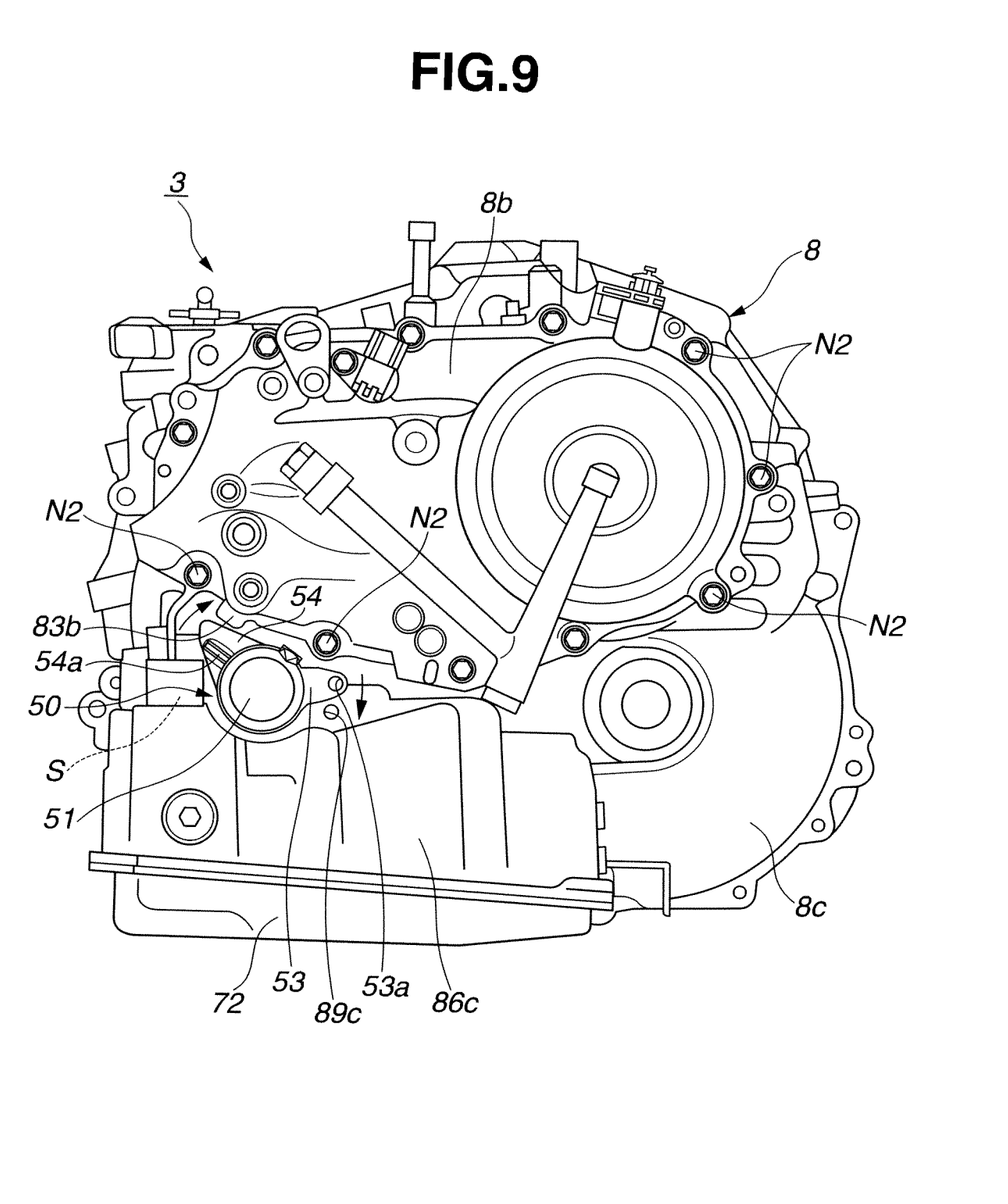
FIG. 9 is a side view of a transmission casing, showing a state before the filter case is fixed.

Further, when covering the oil filter F by the filter case 50, as shown in FIG. 9, the inserting brim portion 54 of the filter case 50 is set so as not to overlap with the overhanging portion 83b of the transmission cover 8b. In this positioning, a position of the screw hole 89c formed on the transmission case 8c and a position of the screw penetration hole 53a formed on the fixing brim portion 53 do not match.

When rotating the filter case 50 in a direction indicated by arrows in FIG. 9 about the case body 51, the position of the screw hole 89c formed on the transmission case 8c and the position of the screw penetration hole 53a formed on the fixing brim portion 53 match, and also the inserting brim portion 54 is inserted into the clearance K between the transmission case 8c and the overhanging portion 83b. As mentioned above, since the inserting brim portion 54 is provided with the whirl-stop protrusion 54a protruding from the case body 51 in the axial direction and this whirl-stop protrusion 54a touches the overhanging portion 83b, an extra rotation of the case body 51 is prevented, and the position of the screw hole 89c and the position of the screw penetration hole 53a can easily match. In addition, since the inserting brim portion 54 inserted into the clearance K between the transmission case 8c and the overhanging portion 83b is set with the clearances provided between the inserting brim portion 54 and the transmission case 8c and also between the inserting brim portion 54 and the overhanging portion 83b (i.e. with the clearances provided above the transmission case 8c and also below the overhanging portion 83b), the inserting brim portion 54 can be inserted smoothly.

Finally, the fixing screw N1 is inserted into the screw penetration hole 53a and is screwed into the screw hole 89c. With this, the filter case 50 is fixed to the transmission case 8c, and the filter case 50 does not fall out and does not rotate about the case body 51.

On the other hand, after the inserting brim portion 54 is inserted between the transmission case 8c and the overhanging portion 83b, the inserting brim portion 54 overlaps with the overhanging portion 83b in the axial direction of the case body 51. Therefore, for instance, even if the fixing screw N1 loosens or comes out, the inserting brim portion 54 interferes with the overhanging portion 83b, and the movement in the axial direction of the case body 51 can be prevented, namely that the case body 51 can be prevented from falling out of the filter concave portion 88c.

With respect to the sealing performance, since the sealing performance by the O-ring 52 is secured by the difference in dimension between the outside diameter of the case body 51 and the inside diameter of the filter concave portion 88c, when preventing the case body 51 from falling out of the filter concave portion 88c, the sealing performance can be secured. That is, the sealing performance by the O-ring 52 does not depend on the pressing force of the filter case 50 against the transmission case 8c.

As explained above, there is no need to press the filter case 50 against the transmission case 8c, and when preventing the case body 51 from falling out of the filter concave portion 88c, the sealing performance can be secured. Thus, the fixing brim portion 53 is not required to be arranged throughout the entire circumference of the filter case 50. This can achieve the reduction of the fixing points, and even when an installation space of the filter case 50 is narrow, it is possible to install the filter case 50.

In particular, in the case of the automatic transmission 3 in the embodiment 1, as shown in FIGS. 4 and 5, the filter attachment area S is located between the transmission cover 8b and a control valve case (the valve unit case portion) 86c, and further the filter attachment area S is located in the depressed or hollow position in the axial direction as compared with the transmission cover 8b and the control valve case 86c. Because of this, the filter attachment area S is extremely narrow. Besides, it is difficult to secure space where tools used for fixing the filter case 50 are inserted.

However, in the automatic transmission 3 in the embodiment 1, as described above, since the fixing point of the filter case 50 is only the fixing brim portion 53, even though the filter attachment area S is narrow, the filter case 50 can be easily fixed.

Further, even if the fixing screw N1 loosens and the filter case 50 moves in the axial direction, the inserting brim portion 54 interferes with the overhanging portion 83b, and the case body 51 is prevented from falling out of the filter concave portion 88c. As a consequence, reduction in the sealing performance does not occur, and an undesirable situation where the fluid pressure is decreased and the vehicle is unable to travel can be prevented.

Furthermore, in the automatic transmission 3 in the embodiment 1, the thickness of the inserting brim portion 54 that serves to prevent the filter case 50 from falling out in the axial direction is set to be smaller (thinner) than the clearance K into which this inserting brim portion 54 is inserted. Thus, even in a case where a dimension error occurs in the clearance K and the inserting brim portion 54 or an assembly error occurs, it is possible to surely insert the inserting brim portion 54 into the clearance K.

Moreover, in the automatic transmission 3 in the embodiment 1, as shown in FIG. 7B, the fixing brim portion 53 and the inserting brim portion 54 are positioned on substantially opposite sides of a center of the case body 51 and protrude in the substantially opposite directions. With this structure, well-balanced installation of the case body 51 is achieved, which prevents the falling out of the case body 51. Also, even though the fixing point is reduced, this structure reduces a tendency for the case body 51 to come off (or to fall out).

In addition, in the automatic transmission 3 in the embodiment 1, since the whirl-stop protrusion 54*a* serving as a rotation stopper of the case body 51 is formed on the inserting brim portion 54, the position of the screw hole 89*c* formed on the transmission case 8*c* and the position of the screw penetration hole 53*a* formed on the fixing brim portion 53 can easily match. This facilitates the attachment of the filter case 50.

Next, effects of the present invention will be explained. In the automatic transmission of the embodiment 1, the following effects can be obtained.

(1) The automatic transmission 3 has: the transmission casing 8 which houses therein the transmission mechanism TM, the transmission casing 8 having: (a) the concave portion 88*c* with which at least the oil inlet 60 or the oil outlet 61 communicates at the inside of the concave portion (the filter concave portion) 88*c*; and (b) the overhanging portion 83*b* which is positioned close to the concave portion 88*c* and extends along the surface (the outer surface) 90*c* of the transmission casing 8 with the clearance K provided between the outer surface 90*c* and the overhanging portion 83*b*, and the filter case 50 which is attached to the transmission casing 8 and has therein the oil filter F, the filter case 50 having; (c) the case body 51 which is inserted into the concave portion 88*c*; (d) the seal member (the O-ring) 52 which fits onto the outer circumference of the case body 51 and seals the boundary between the outer circumferential surface 51*a* of the case body 51 inserted into the concave portion 88*c* and the inside surface of the concave portion 88*c*; (e) the first brim portion (the fixing brim portion) 53 which protrudes from the outer circumferential surface 51*a* of the case body 51 and is fixed to the outer surface 90*c* of the transmission casing 8; and (f) the second brim portion (the inserting brim portion) 54 which protrudes from the outer circumferential surface 51*a* of the case body 51 and is inserted into the clearance K.

With this, it is possible to reduce the fixing points of the filter case 50 while securing the sealing performance between the transmission casing 8 and the filter case 50.

(2) The thickness of the second brim portion (the inserting brim portion) 54 is set to be thinner than the clearance K.

With this, even in a case where the dimension error or an assembly error occurs, it is possible to surely insert the second brim portion (the inserting brim portion) 54 into the clearance K, and performance of assembly of the filter case 50 can be improved.

(3) The seal member (the O-ring) 52 is positioned between the opening of the concave portion 88*c* and the oil inlet 60 or the oil outlet 61 communicating with the concave portion 88*c*.

With this, the sealing performance between the transmission casing 8 and the filter case 50 can be secured.

(4) The first brim portion (the fixing brim portion) 53 and the second brim portion (the inserting brim portion) 54 are positioned on substantially opposite sides of the center of the case body 51 and protrude in substantially opposite directions.

With this, despite less fixing point of the filter case 50, the filter case 50 can be fixed with stability.

(5) The second brim portion (the inserting brim portion) 54 has the rib (the whirl-stop protrusion) 54*a* that serves as a rotation stopper of the case body 51 by touching the overhanging portion 83*b* of the transmission casing 8 when the filter case 50 is rotated.

With this, the extra rotation of the case body 51 is prevented when fixing the filter case 50 in assembly, and this facilitates the attachment of the filter case 50.

Although the present invention has been described above, it is not limited to the above embodiment.

In the automatic transmission 3 in the embodiment 1, the overhanging portion 83*b* is provided on the circumferential edge portion of the transmission cover 8*b*. However, instead of the overhanging portion 83*b*, for instance, a part of the transmission case 8*c* or a part of the control valve case 86*c* could be the overhanging portion.

Further, in the automatic transmission 3 in the embodiment 1, as the seal member that fits onto the outer circumference surface of the filter case 50, the O-ring 52 is used. However, instead of the O-ring 52, an annular lip packing, which has a pressure-receiving surface (an inner circumferential surface of the filter concave portion 88*c*) side lip structure, could be employed.

Furthermore, in the automatic transmission 3 in the embodiment 1, one fixing brim portion 53 and one inserting brim portion 54 are provided. In the present invention, at least one fixing brim portion and at least one inserting brim portion are needed. Therefore, two or more fixing brim portion and two or more inserting brim portion might be provided, depending on the installation position of the filter case 50.

The entire contents of Japanese Patent Application No. 2009-166446 filed on Jul. 15, 2009 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An automatic transmission comprising:
   a transmission casing which houses therein a transmission mechanism, the transmission casing having:
      a concave portion with which at least an oil inlet or an oil outlet communicates at an inside of the concave portion; and
      a first overhanging portion which extends along a surface of the transmission casing with a clearance provided between the surface and the first overhanging portion, and
   a filter case which is attached to the transmission casing and has therein an oil filter, the filter case having:
      a case body which is inserted into the concave portion;
      a seal member which fits onto an outer circumference of the case body and seals a boundary between an outer circumferential surface of the case body inserted into the concave portion and an inside surface of the concave portion;
      a first brim portion which protrudes from the outer circumferential surface of the case body and is fixed to the surface of the transmission casing; and
      a second brim portion which protrudes from the outer circumferential surface of the case body and is inserted into the clearance,
   the first brim portion and the second brim portion being arranged at different heights in an axial direction of the filter case, and
   the second brim portion having a second overhanging portion that serves as a rotation stopper of the case body and touches the first overhanging portion of the transmission casing when the filter case is rotated.

2. The automatic transmission as claimed in claim 1, wherein:

a thickness of the second brim portion is set to be thinner than the clearance.

3. The automatic transmission as claimed in claim 1, wherein:
the seal member is positioned between an opening of the concave portion and the oil inlet or the oil outlet communicating with the concave portion.

4. The automatic transmission as claimed in claim 1, wherein:
the first brim portion and the second brim portion are positioned on substantially opposite sides of a center of the case body and protrude in substantially opposite directions.

5. The automatic transmission as claimed in claim 1, wherein:
the filter case is provided, on the first brim portion, with a filter case screw hole into which a screw for fixing the filter case to the transmission casing is inserted,
the transmission casing is provided, on the surface, with a transmission casing screw hole into which the screw is screwed, and
when the second overhanging portion touches the first overhanging portion, a position of the filter case screw hole and a position of the transmission casing screw hole align.

* * * * *